United States Patent [19]

Duling, III et al.

[11] Patent Number: 5,119,383
[45] Date of Patent: Jun. 2, 1992

[54] ANTIRESONANT NONLINEAR MIRROR FOR PASSIVE LASER MODELOCKING

[75] Inventors: Irl N. Duling, III, Middleburg, Va.; Thomas F. Carruthers, Laurel, Md.

[73] Assignee: The United States of America as represented by the Secretary of the Navy, Washington, D.C.

[21] Appl. No.: 635,016

[22] Filed: Dec. 28, 1990

[51] Int. Cl.[5] .............................................. H01S 3/098
[52] U.S. Cl. ...................................... 372/18; 372/21; 372/22; 372/30; 372/33; 372/94; 372/99; 372/105; 372/106; 372/108
[58] Field of Search ....................... 372/99, 94, 21, 22, 372/105, 106, 108, 97, 18-19, 30, 33, 10-12; 356/349, 350

[56] References Cited

U.S. PATENT DOCUMENTS

| | | | |
|---|---|---|---|
| 3,869,210 | 3/1975 | Fletcher et al. | 356/350 |
| 3,928,818 | 12/1975 | White | 372/33 |
| 4,372,685 | 2/1983 | Ulrich | 356/350 |
| 4,546,477 | 10/1985 | Richards | 372/12 |
| 4,617,665 | 10/1986 | Mourou et al. | 372/18 |
| 4,715,689 | 12/1987 | O'Meara | 350/354 |
| 4,802,176 | 1/1989 | O'Meara | 372/19 |
| 4,815,080 | 3/1989 | Chesney et al. | 372/30 |
| 4,890,922 | 1/1990 | Wilson | 356/350 |
| 4,899,345 | 2/1990 | Cyr et al. | 372/32 |

OTHER PUBLICATIONS

Blow et al., "Experimental Demonstration of Optical . . . " Opt. Lett. vol. 14(14) Jul. 15, 1989, pp. 754-756.
"Pulse Shortening by a Nolinear Mirror Node Locker", Applies Optics, Stankov, vol. 28, No. 5, Mar. 1989.
"Self Starting Condition for Additive-Pulse Mode-locked Lasers," E. P. Ippen et al., Optics Letters, vol. 5, No. 3, Feb. 1, 1990, pp. 183-185.
"An Antiresonant Ring Interferometers for Coupled Laser Cavities, Laser Output Coupling, Mode Locking, and Cavity Dumping", A. E. Sregnan, IEEE Journal of Quantum Electronics, Feb. 1973, pp. 247-250.
"A mirror with an Intensity-Dependent Reflection Coefficient," Appl. Phys., B45, 191, 195 (Jan. 1988), K. A. Stankov, pp. 191-195.
"A New Mode-Locking Technique Using A Nonlinear Mirror," Stankov et al., Optics Communication, vol. 66, No. 1, Apr. 1, 1988, pp. 41-46.
"Method of Passive and Active Mode Locking Using Intravity Optical Frequencies Frequency", Stankov, Optics Lett, vol. 14, No. 1, Jan. 1, 1989, pp. 51-53.

*Primary Examiner*—Georgia Y. Epps
*Attorney, Agent, or Firm*—Thomas E. McDonnell; George Jameson

[57] ABSTRACT

An antiresonant nonlinear mirror to replace one mirror of a laser for passive modelocking of the laser, the antiresonant nonlinear mirror comprising: a beam splitter for coupling the mirror to a laser cavity; a mirror arrangement for defining an optical ring with the beam splitter in which two light beams produced by the beam splitter in response to a light beam from the laser cavity can counterpropagate around the ring; an intensity dependent anisotropic nonlinear element disposed within the ring; and a polarization sensitive element disposed within the ring for adjusting the birefringence thereof to produce spontaneous modelocking in the coupled laser cavity.

9 Claims, 2 Drawing Sheets

ANTIRESONANT NONLINEAR MIRROR FOR PASSIVE LASER MODELOCKING

FIELD OF THE INVENTION

The present invention relates in general to nonlinear mirrors, and in particular to antiresonant nonlinear mirrors for passive mode locking of lasers which do not require active length stabilization.

BACKGROUND OF THE INVENTION

Various techniques of passively mode locking lasers have been developed which use two coupled cavities, one with gain and one with a nonlinear optical element or mirror which returns to the laser cavity an optical pulse shorter in duration than that which was incident on it. Stankov, "A Mirror with an Intensity-Dependent Reflection Coefficient," *Applied Physics B*, Vol. 45, pp. 191-195 (1988), describes the use of one type of nonlinear mirror with power (intensity) dependent reflection to mode-lock a Nd:YAG laser and thereby obtain short light pulses. In the Stankov device, an intense light beam at frequency $\omega$ generates a second harmonic beam in a nonlinear crystal. The total second harmonic at $2\omega$ and part of the fundamental beam are reflected by a dichroic mirror back through a phase-adjusting glass plate to provide the necessary phase relation between the two reflected light waves, and then back through the nonlinear crystal. In the second pass through the crystal, partial reconversion of the second harmonic into the fundamental wavelength takes place. The degree of conversion and reconversion is dependent on the intensity of the incident beam.

Another example is the additive pulse or coupled cavity laser, in which the main laser cavity is coupled to an external cavity containing the nonlinear element. Pulses which are altered in phase or amplitude in the external cavity combine at the output coupler with the pulses in the main cavity so that the central, high intensity portions of the pulses are preferentially returned to the main cavity. See Mark, et al., "Femtosecond pulse generation in a laser with a nonlinear external resonator," *Optics Letters*, Vol. 14, pp. 48-50 (1989); Kean, et al., "Enhanced modelocking of color-center lasers," *Optics Letters*, Vol. 14, pp. 39-41 (1989); and Barr et al., "Coupled cavity modelocking of a Nd:YAG laser using second harmonic generation," *Optical Society of America Conference on Lasers and Electro-Optics. 1989 Technical Digest Series*, Vol. 11, p. 442 (1989).

U.S. Pat. No. 4,853,933 to Blow et al. discloses another coupled cavity mode locked laser in which the external cavity comprises a nonlinear element into which the beam reflected from a splitter is injected, and a mirror downstream of the nonlinear element. The nonlinear element is either a dispersive or nondispersive medium in which the nonlinear loss or transmission effects predominate over any dispersive effects and nonlinear refractive index effects.

Such lasers have produced nearly transform-limited pulses, and show great promise in being able to utilize the gain bandwidth of solid state lasers to produce the shortest pulses possible from this type of laser. However, such lasers typically require active feedback circuits (length stabilization) to maintain the proper phase relationship between the two cavities. In addition, active mode locking may also be required to produce sufficiently high peak powers to initiate the nonlinear process. See Ippen et al., "Additive pulse modelocking," *Journal of Optical Society of America B*, Vol. 6, pp. 1736-1745 (1989).

It was also known that optical soliton switching could be achieved in an all-fiber nonlinear loop mirror or Sagnac (antiresonant ring) interferometer. See Doran, et al., "Nonlinear-optical loop mirror," *Optics Letters*, Vol. 13, No. 1, pp. 56-58 (January 1988); and Blow, et al., "Experimental demonstration of optical soliton switching in an all-fiber nonlinear Sagnac interferometer," *Optics Letters*, Vol. 14, No. 14, pp. 754-756 (July 1989). Similarly, Siegman, "An antiresonant ring interferometer for coupled laser cavities, laser output coupling, modelocking, and cavity dumping," *Journal of Quantum Electronics*, pp. 247-250 (February 1973) discloses various linear antiresonant ring mirror embodiments for use in lasers which include the use of frequency doubling crystals to obtain a laser output at a doubled frequency. In one embodiment, a phase shifter is also provided to shift the relative phases between the second harmonic and the fundamental frequency beams within the ring so that the counterpropagating beams add or interfere such that the second harmonic beam is rejected from the ring and all of the fundamental beam is returned to the laser cavity. Also, Otsuka, "Nonlinear antiresonant ring interferometer," *Optics Letters*, Vol. 8, pp. 471-473 (1983) discloses a transmissive antiresonant ring with a Kerr effect medium and an unbalanced beam splitter for use in switching and logic operations.

SUMMARY OF THE INVENTION

It is accordingly an object of the present invention to provide a nonlinear mirror which produces pulse shortening without the need for length stabilization.

This and other objects and advantages are achieved in accordance with the present invention by an antiresonant nonlinear mirror to replace one mirror of a laser, wherein the antiresonant nonlinear mirror comprises: a beam splitter coupled to the laser cavity; a mirror arrangement for defining an optical ring with the beam splitter in which two light beams produced by the beam splitter in response to a light beam from the laser cavity can counterpropagate around the ring; intensity dependent anisotropic nonlinear apparatus disposed within the ring; and polarization sensitive apparatus also disposed within the ring for adjusting the linear birefringence thereof to produce spontaneous modelocking in a coupled laser cavity.

In accordance with one aspect of the present invention, the polarization sensitive apparatus is provided by appropriately orienting the nonlinear apparatus.

In accordance with another aspect of the present invention, the polarization sensitive apparatus includes Faraday rotators for cross polarizing the counterpropagating beams passing through the nonlinear apparatus.

The nonlinear mirror of the present invention causes a laser cavity to which it is coupled to passively modelock regardless of the cavity length, and therefore requires no length stabilization. These and other features and advantages of the present invention are described in or apparent from the following detailed description of preferred embodiments.

BRIEF DESCRIPTION OF THE DRAWINGS

The preferred embodiments will be described with reference to the drawings, in which like elements have been denoted with like reference numbers throughout the figures, and in which.

DETAILED DESCRIPTION OF THE PREFERRED EMBODIMENTS

Figure 1:
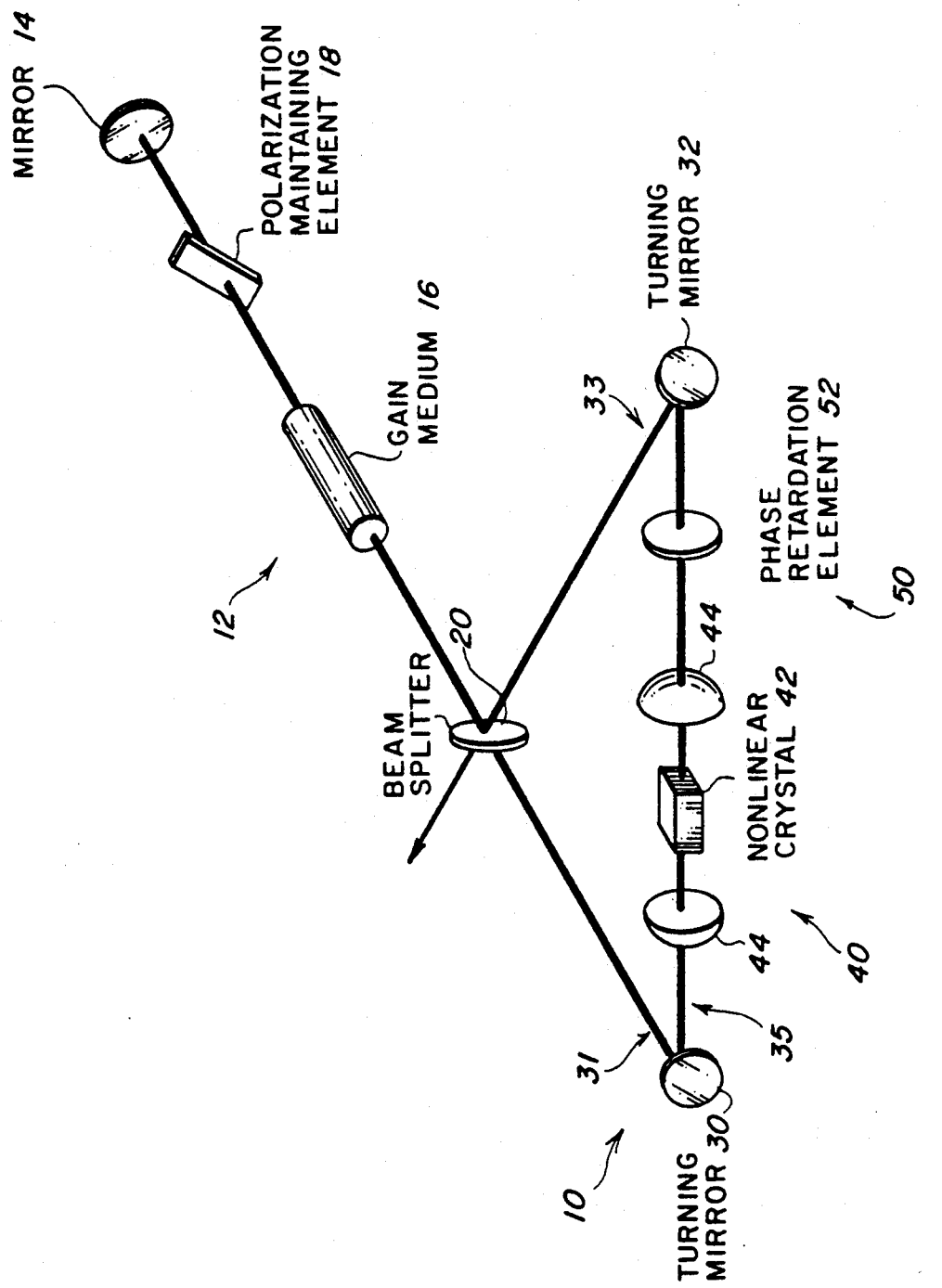
FIG. 1 is a diagrammatic view of a first embodiment of an antiresonant nonlinear mirror according to the present invention shown coupled to a laser cavity.
Figure 2:
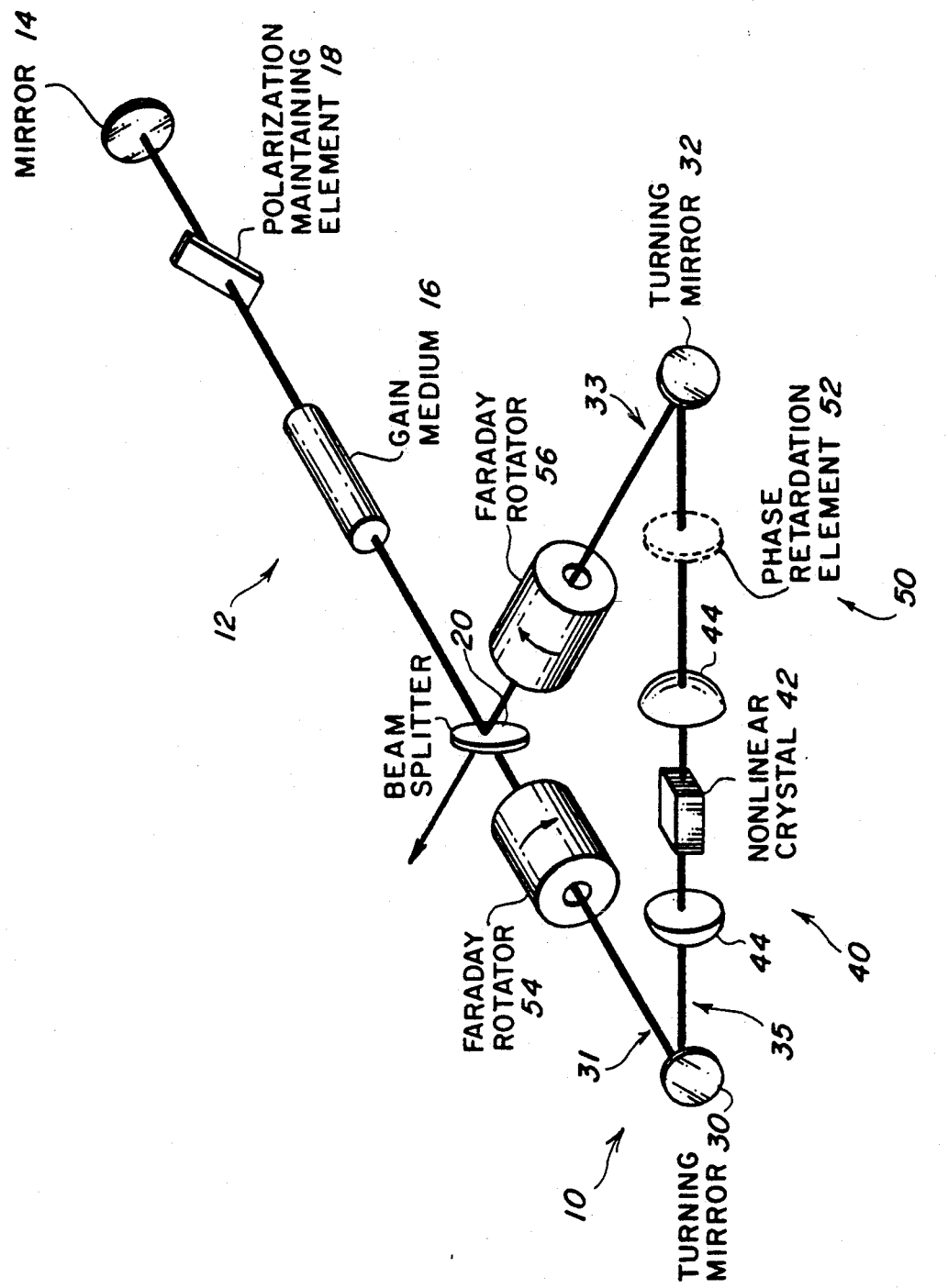
FIG. 2 is a diagrammatic view of a second embodiment of an antiresonant nonlinear mirror according to the present invention similar to the embodiment of FIG. 1 and incorporating Faraday rotators as part of the polarization sensitive apparatus.

Although the antiresonant nonlinear mirror of the invention is shown in FIGS. 1 and 2 (to be discussed) replacing one mirror of a linear (two mirror) laser cavity, it should be understood that the laser cavity could comprise any suitable number of mirrors, any one of which the antiresonant nonlinear mirror of the invention could replace. In addition, any of the mirrors of the laser or of the invention (including the beamsplitter) could be used as the output coupler.

Referring generally to the figures, an antiresonant nonlinear mirror 10 which is constructed in accordance with the present invention generally comprises a beam splitter 20; first and second turning mirrors 30 and 32, respectively, for defining an optical loop or ring with beam splitter 20 in which two light beams (pulses) produced by beam splitter 20 in response to a light beam (pulse) from laser cavity 12 counterpropagate around the ring; apparatus, generally denoted 40, which is anisotropic and nonlinearly intensity dependent in either phase or amplitude disposed in the ring; and polarization sensitive apparatus, generally denoted 50, disposed in the ring for adjusting the polarization of the counterpropagating beams in the ring. As shown, laser cavity 12 comprises, as is conventional, a second mirror 14 at the other end thereof, a gain medium 16, and preferably a polarization selective element 18, such as a Brewster plate, for producing linear polarization of the light beams within laser cavity 12.

As shown in FIG. 1, turning mirrors 30 and 32 respectively define first and second optical legs 31 and 33 with beam splitter 20, and a third optical leg 35 therebetween. Nonlinear apparatus 40 is disposed at least in part in optical leg 35 of the optical ring between mirrors 30 and 32. The gain medium 16 is optically pumped by means (not shown) to develop the above-described light beam pulse in the laser cavity 12 that is applied to the beam splitter 20. Apparatus 40 comprises an element 42 made of any intensity dependent anisotropic nonlinear material, and can include associated focussing optics 44, as shown. Advantageously, a nonlinear anisotropic material having a polarization sensitive nonlinear effect (i.e., the nonlinearity changes from one axis of polarization to another) is used, in which case beam splitter 20 has a splitting ratio of 50:50. An example of such a material which has been used successfully in passively modelocking a Nd:YAG laser is a second harmonic generating (SHG) crystal, e.g., a Type II SHG crystal such as potassium titanyl phosphate (KTP), which produces a usable output at the doubled frequency of the input light pulses. Alternatively, nonlinear element 42 is made of an isotropic nonlinear material, such as SF-6 flint glass. With an isotropic nonlinear element 42, beam splitter 20 has a splitting ratio not equal to 50:50 to provide unequal intensities in the counterpropagating beams within the ring, and apparatus 40 preferably further includes phase retardation element 52 and Faraday rotators 54 and 56 (FIG. 2), to be discussed in more detail hereinbelow, are also provided.

A polarization sensitive form of nonlinear element 42, e.g., a Type II SHG crystal, in which the angle of the element is adjusted such that the counterpropagating light beams within the mirror have two different planes of polarization which are each respectively different from the plane of polarization in laser cavity 12, advantageously comprises polarization sensitive apparatus 50. As shown in FIG. 1, to simplify adjustment of the polarization, and to adjust the pulse width and control the pulse amplitude stability, polarization sensitive apparatus 50 advantageously includes, whether or not nonlinear element 42 is polarization sensitive, a phase retardation element 52 disposed in optical leg 35 of the optical ring. A quarter-wave plate or Soliel-Babinet compensator advantageously constitutes element 52.

Alternatively, as shown in FIG. 2, polarization sensitive apparatus 50 advantageously further comprises, in lieu of or in addition to phase retardation element 52, first and second Faraday rotators 54 and 56 (optical elements which rotate the plane of polarization by 45° in a nonreciprocal manner) respectively disposed in optical legs 31 and 33, such that between rotators 54 and 56 the counterpropagating beams are orthogonally, or cross polarized in optical leg 35. As a consequence, in the case of a crystalline form of nonlinear element 42, each of the beams interacts with only one polarization axis of nonlinear element 42; and in the case of an isotropic form of nonlinear element 42, the effect of the Faraday rotators in conjunction with phase retardation element 52 is to provide the required intensity independent relative phase shift between the counterpropagating beams. The orthogonal orientation of the Faraday rotators also serves to rotate both counterpropagating beams back to their original polarization (linear if laser cavity 12 includes a polarization selective element 18) before they meet at beam splitter 20, so that they can recombine interferometrically.

In order to provide spontaneous modelocking of a coupled laser cavity 12, the birefringence of mirror 10 is adjusted so that mirror 10 returns to laser cavity 12 a shorter pulse than it received. This is accomplished by adjusting polarization sensitive apparatus 50 to adjust the birefringence in the ring so that the polarization of the pulses in laser cavity 12 is biased to rotate the polarization of the wings (low intensity portions) of the pulses out of the plane of laser oscillation so that they are rejected; and so that nonlinear, intensity-dependent polarization rotation causes the peak of the pulses to be transmitted to the gain medium 16 in the laser cavity 12. That is, nonlinear apparatus 40 changes the relative nonlinear phase (and amplitude, in the case of a SHG crystal form of element 42) temporal profiles of the counterpropagating beams, and polarization sensitive apparatus 50 modifies the relative intensity independent phases of the counterpropagating beams so that the beams recombine at beam splitter 20 to achieve pulse shortening. Thus, the antiresonant nonlinear mirror 10 reflects the light incident on it from the gain medium 16 back to the gain medium 16 after such pulse shortening is achieved. A mathematical model describing the behavior of the mirror of the present invention is described in more detail in a paper by applicants, "Passive Laser Mode Locking with an Antiresonant Nonlinear Mirror," published in *Optics Letters*, Vol. 15, pp. 804–806 (1990), which is hereby incorporated herein by reference for all purposes.

The present invention has been described with respect to exemplary embodiments. It will be appreciated that numerous changes and modifications can be made without departing from the scope or spirit of the invention. In particular, it will be appreciated that the antiresonant nonlinear mirror of the present invention can be used with any laser, including fiber lasers, in which case the mirror is advantageously implemented with fiber splitters and components. Further, instead of bulk components, the mirror is readily implemented in monolithic or integrated form.

We claim:

1. An antiresonant nonlinear mirror to replace one of the mirrors of a laser, which laser includes a gain medium, means for pumping the gain medium and a laser cavity, to produce modelocking, said antiresonant nonlinear mirror comprising:
   a beam splitter;
   mirror means for defining an optical ring with said beam splitter in which two light beams produced by said beam splitter in response to a polarized light beam from the gain medium can counterpropagate around said ring;
   intensity dependent anisotropic nonlinear means disposed within said ring for changing the relative nonlinear phase temporal profiles of the two counterpropagating light beams; and
   polarization sensitive means disposed within said ring for adjusting the polarization of the counterpropagating light beams in the ring to produce spontaneous modelocking in the laser.

2. The antiresonant nonlinear mirror of claim 1 wherein:
   said mirror means comprises first and second turning mirrors respectively defining first and second optical legs with said beam splitter, and further defining a third optical leg therebetween;
   said nonlinear means is at least partly disposed in said third optical leg; and
   said polarization sensitive means is at least partly disposed in said third optical leg.

3. The antiresonant nonlinear mirror of claim 2 wherein said polarization sensitive means comprises phase retardation means disposed in said third optical leg.

4. The antiresonant nonlinear mirror of claim 3 wherein said polarization sensitive means further comprises first and second Faraday rotators respectively disposed in said first and second optical legs.

5. The antiresonant nonlinear mirror of claim 3 wherein said nonlinear means comprises an anisotropic crystal having different nonlinearities for first and second planes of polarization.

6. The antiresonant nonlinear mirror of claim 3 wherein said anisotropic crystal is an SHG crystal.

7. The antiresonant nonlinear mirror of claim 5 wherein said nonlinear means is oriented so as to constitute said polarization sensitive means.

8. The antiresonant nonlinear mirror of claim 2 wherein said nonlinear means comprises an intensity dependent nonlinear element and phase retardation means disposed in said third leg, first and second Faraday rotators respectively disposed in said first and second optical legs, and said beam splitter has a splitting ratio not equal to 50:50.

9. A passively modelocked laser comprising:
   a laser comprising a first mirror, a gain medium, means for pumping the gain medium, a laser cavity and an antiresonant nonlinear mirror, said nonlinear mirror comprising:
   a beam splitter;
   mirror means for defining an optical ring with said beam splitter in which two light beams produced by said beam splitter in response to a light beam from said laser cavity counterpropagate around said ring;
   intensity dependent anisotropic nonlinear means disposed within said ring for changing the relative nonlinear phase temporal profiles of the two counterpropagating light beams; and
   polarization sensitive means disposed within said ring for adjusting the polarization of the counterpropagating light beams in the ring to produce spontaneous modelocking in said laser.

* * * * *